(12) United States Patent
Steere et al.

(10) Patent No.: US 7,146,017 B2
(45) Date of Patent: Dec. 5, 2006

(54) ELECTRICAL CONNECTORS FOR ELECTRO-DYNAMIC LOUDSPEAKERS

(75) Inventors: John F. Steere, Martinsville, IN (US); Ronald E. Fenwick, Bloomington, IN (US); David B. Garner, Indianapolis, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 496 days.

(21) Appl. No.: 10/429,228

(22) Filed: May 2, 2003

(65) Prior Publication Data

US 2004/0009716 A1     Jan. 15, 2004

Related U.S. Application Data (60) Provisional application No. 60/380,001, filed on May 2, 2002, provisional application No. 60/378,188, filed on May 6, 2002, provisional application No. 60/391,134, filed on Jun. 24, 2002.

(51) Int. Cl.
*H04R 25/00* (2006.01)
(52) U.S. Cl. .................... 381/176; 381/399
(58) Field of Classification Search ............ 381/152, 381/173–176, 190–191, 399, 431
See application file for complete search history.

(56) References Cited

U.S. PATENT DOCUMENTS

| | | | |
|---|---|---|---|
| 1,643,791 A | 9/1927 | Slepian | |
| 3,141,071 A | 7/1964 | Rich | |
| 3,164,686 A | 1/1965 | Tibbetts | |
| 3,570,626 A | 3/1971 | Mochida et al. | |
| 3,654,403 A | 4/1972 | Bobb | |
| 3,674,946 A | 7/1972 | Winey | |
| 3,919,499 A | 11/1975 | Winey | |
| 4,037,061 A | 7/1977 | von Recklinghausen | |
| 4,210,786 A | 7/1980 | Winey | |
| 4,264,789 A | 4/1981 | Kaizu et al. | |
| 4,281,223 A | 7/1981 | Ugaji et al. | |
| 4,316,062 A | 2/1982 | Beveridge | |
| 4,384,173 A | 5/1983 | Briefer et al. | |
| 4,468,530 A | 8/1984 | Torgeson | |
| 4,471,172 A | 9/1984 | Winey | |
| 4,471,173 A | 9/1984 | Winey | |

(Continued)

FOREIGN PATENT DOCUMENTS

DE     1 799 329     11/1959

(Continued)

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue University, West Lafayette, Indiana.

(Continued)

*Primary Examiner*—Suhan Ni
(74) *Attorney, Agent, or Firm*—Pauley Petersen & Erickson (57) ABSTRACT

An electro-dynamic loudspeaker is typically provided with a diaphragm mounted to a frame in tension. The diaphragm is provided with a plurality of electrical traces that are disposed within a magnetic field of a plurality of magnets that are mounted to the frame. Electric current applied to the circuit causes electric current to pass through the wiring that interacts with the magnetic field of the magnets to thereby cause vibration of the diaphragm that causes the sound generated by the electro-dynamic loudspeaker. Electrical connector arrangements and methods are provided for connecting the electric circuit of the diaphragm to a power amplifier.

12 Claims, 9 Drawing Sheets

U.S. PATENT DOCUMENTS

| | | |
|---|---|---|
| 4,480,155 A | 10/1984 | Winey |
| 4,484,037 A | 11/1984 | Nieuwendijk et al. |
| 4,536,623 A | 8/1985 | Larson |
| 4,544,805 A | 10/1985 | Sawafuji et al. |
| 4,584,439 A | 4/1986 | Paddock |
| 4,653,103 A | 3/1987 | More et al. |
| 4,703,510 A | 10/1987 | Larson |
| 4,723,296 A | 2/1988 | Nieuwendijk et al. |
| 4,750,257 A | 6/1988 | Larson |
| 4,803,733 A | 2/1989 | Carver et al. |
| 4,837,838 A | 6/1989 | Thigpen |
| 4,924,504 A | 5/1990 | Burton |
| 4,939,784 A | 7/1990 | Bruney |
| 5,021,613 A | 6/1991 | Garcia |
| 5,148,493 A | 9/1992 | Bruney |
| 5,195,143 A | 3/1993 | Spiegel |
| 5,283,836 A | 2/1994 | Trufitt |
| 5,297,214 A | 3/1994 | Bruney |
| 5,430,805 A | 7/1995 | Stevenson et al. |
| 5,627,903 A | 5/1997 | Porrazzo et al. |
| 5,764,595 A | 6/1998 | Power |
| 5,850,461 A | 12/1998 | Zelinka |
| 5,901,235 A | 5/1999 | Thigpen et al. |
| 5,905,805 A | 5/1999 | Hansen |
| 5,953,438 A | 9/1999 | Stevenson et al. |
| 5,961,762 A | 10/1999 | Zelinka et al. |
| 6,008,714 A | 12/1999 | Okuda et al. |
| 6,104,825 A | 5/2000 | Thigpen |
| 6,097,830 A | 8/2000 | Zelinka et al. |
| 6,154,557 A | 11/2000 | Montour et al. |
| 6,185,310 B1 | 2/2001 | Kermani et al. |
| 6,546,106 B1 | 4/2003 | Azima |
| 6,593,847 B1 | 7/2003 | Miyazaki et al. |
| 6,845,166 B1 | 1/2005 | Hara et al. |
| 2001/0005419 A1 | 6/2001 | Kermani et al. |
| 2001/0009586 A1 | 7/2001 | Suzuki |
| 2001/0048256 A1 | 12/2001 | Miyazaki et al. |
| 2002/0191808 A1 | 12/2002 | Croft, III et al. |

FOREIGN PATENT DOCUMENTS

| | | |
|---|---|---|
| DE | 30 33 631 A1 | 4/1982 |
| DE | 30 38 905 A1 | 5/1982 |
| EP | 0 995 311 A1 | 4/2000 |
| EP | 0 996 311 A1 | 4/2000 |
| EP | 1 158 835 A2 | 11/2001 |
| EP | 1 194 001 A1 | 4/2002 |
| FR | 2 765 767 | 1/1999 |
| GB | 2 034 153 A | 5/1980 |
| JP | 54076130 | 6/1979 |
| JP | 54098612 | 8/1979 |
| JP | 57184398 | 11/1982 |
| JP | 01228300 | 9/1989 |
| JP | 08331684 | 12/1996 |
| WO | WO 95/24815 | 9/1995 |

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

EDM Charmilles: A Practical Guide to Electro-Discharge Machining: Atellers des Charmilles S.A. (p. 12-13).

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5., May 2004.

ELECTRICAL CONNECTORS FOR ELECTRO-DYNAMIC LOUDSPEAKERS

CROSS REFERENCE TO RELATED APPLICATIONS

This application claims the benefit of U.S. Provisional Application No. 60/380,001, filed on May 2, 2002; U.S. Provisional Application No. 60/378,188, filed on May 6, 2002; and U.S. Provisional Application No. 60/391,134, filed on Jun. 24, 2002. The patent applications are incorporated by reference.

CROSS REFERENCE TO CO-PENDING APPLICATIONS

This application incorporates by reference the disclosures of each of the following co-pending applications which have been filed concurrently with this application: U.S. patent application Ser. No. 10/428,313, entitled "Mounting Bracket System," filed May 2, 2003; U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/428,314, entitled "Electro-Dynamic Loudspeaker Mounting System," filed May 2, 2003; U.S. patent application Ser. No. 10/429,173, entitled "Conductors For Electro-Dynamic Loudspeakers," filed May 2, 2003; U.S. patent application Ser. No. 10/429,164, entitled "Frame Structure," filed May 2, 2003; U.S. patent application Ser. No. 10/429,289, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; U.S. patent application Ser. No. 10/429,243, entitled "Frequency Response Enhancements For Electro-Dynamic Loudspeakers," filed May 2, 2003; and U.S. patent application Ser. No. 10/429,163, entitled "Magnet Arrangement For Loudspeaker," filed May 2, 2003.

BACKGROUND OF THE INVENTION

1. Field of Invention

The invention relates to electro-dynamic loudspeakers, and more particularly, to electrical connectors for electro-dynamic loudspeakers and related manufacturing methods.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

The frame of the electro-dynamic loudspeakers supports the magnets, the diaphragm, and the terminal. A ferrous steel frame has the advantage of carrying magnetic flux that can improve efficiency over a non-ferrous frame. The frame presents design challenges since it is preferably rigid enough to keep the diaphragm film tension uniform and capable of not deforming during handling, assembly, or over time. The frame also should be capable of withstanding environmental high temperatures, humidity, salt, spray, etc., and be capable of bonding with the diaphragm film.

Other features affecting the acoustic characteristics of the electro-dynamic loudspeaker include damping of undriven portions of the diaphragm film in order to help reduce distortion and smooth frequency response. Damping is required to control film edges by reducing unproductive vibration.

Furthermore, the control directivity of sound is critical for a good system design and acoustical interaction in the listening environment. The electro-dynamic loudspeakers exhibit defined acoustical directivity relative to frequency and to their shape and also relative to the distance from the source. In addition, other frequency response enhancements can also be made to the current electro-dynamic loudspeaker designs.

With the dimensional flexibility obtained with an electro-dynamic loudspeaker, various locations in automotive and non-automotive vehicles may be employed to house electro-dynamic loudspeakers. Different locations offer various advantages over other locations. The thin depth of the electro-dynamic loudspeaker allow them to fit where conventional loudspeakers would not. The final assembly may be mounted on a vehicle, and therefore, must be rigid during shipping and handling and should not allow the diaphragm or frame to deform during installation.

SUMMARY

The invention provides several electrical connector arrangements for connecting an electro-dynamic loudspeaker to a power amplifier. The diaphragm of the electro-dynamic loudspeaker is provided with an extension portion extending beyond a periphery of a frame of the electro-dynamic loudspeaker. Electrical traces are disposed on the surface of the extension portion in order to provide a flexible wire harness integrally formed with the diaphragm. A hard block connector is mounted on the end of the extension portion for connection to a power amplifier.

A capacitor is mounted to the frame and provides a jumper between one of the elongated conductive pads provided on the extension portion of the diaphragm and with a terminal end of the conductor.

Also, an electro-dynamic loudspeaker is provided with a pair of terminal lugs extending through the frame and the diaphragm and each contacting a terminal end of an electrical circuit disposed on the surface of the diaphragm. The terminal lugs include a deformable end portion that is bent in order to contact the terminal ends of the electrical circuit. The terminal lugs also include an eyelet for connection with a wire for connecting the electro-dynamic loudspeaker to a power amplifier. Electrical joint compound can be disposed between the deformable end portions of the terminal lugs and the terminal ends of the electrical circuit disposed on the diaphragm.

The electrical circuit disposed on the surface of the diaphragm can be formed from aluminum while the terminal ends of the aluminum conductor pads are layered with copper in order to facilitate conventional soldering processes without the requirement of using flux during the soldering process.

The electrical circuit disposed on the surface of a diaphragm can be formed from a thin layer of copper for defining a plurality of linear sections.

Also, the electrical circuit disposed on the surface of the diaphragm can be formed from aluminum defining a plurality of elongated sections and further including a layer of copper disposed on the aluminum elongated linear sections.

A method is provided for forming an electrical contact with a thin film electro-dynamic loudspeaker including laser welding a pair of lead wires to the terminal end portions of the electric circuit.

Also, a method of forming an electrical contact with a thin film electro-dynamic loudspeaker includes ultrasonically soldering a pair of lead wires to the terminal end portions of the electrical circuit provided on the diaphragm of the electro-dynamic loudspeaker.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views

DETAILED DESCRIPTION

Figure 1:
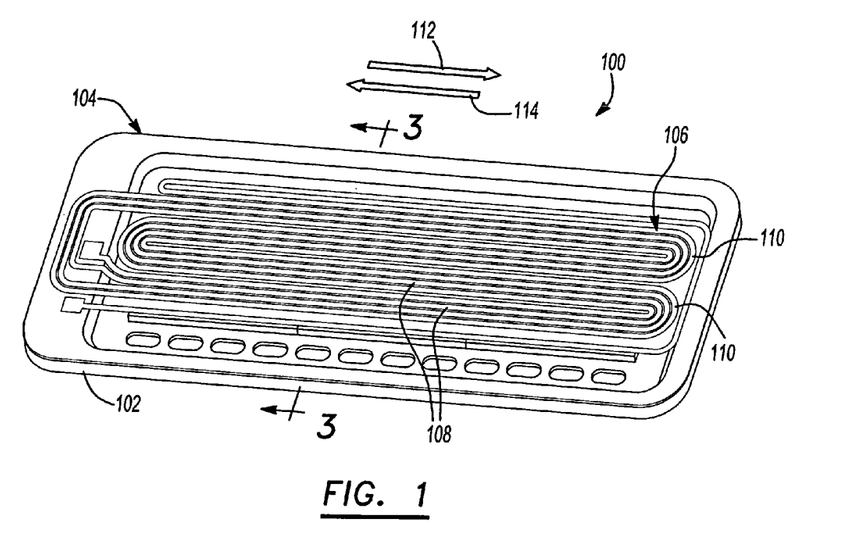
FIG. 1 is a perspective view of a electro-dynamic loudspeaker as it would appear with the grille removed.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
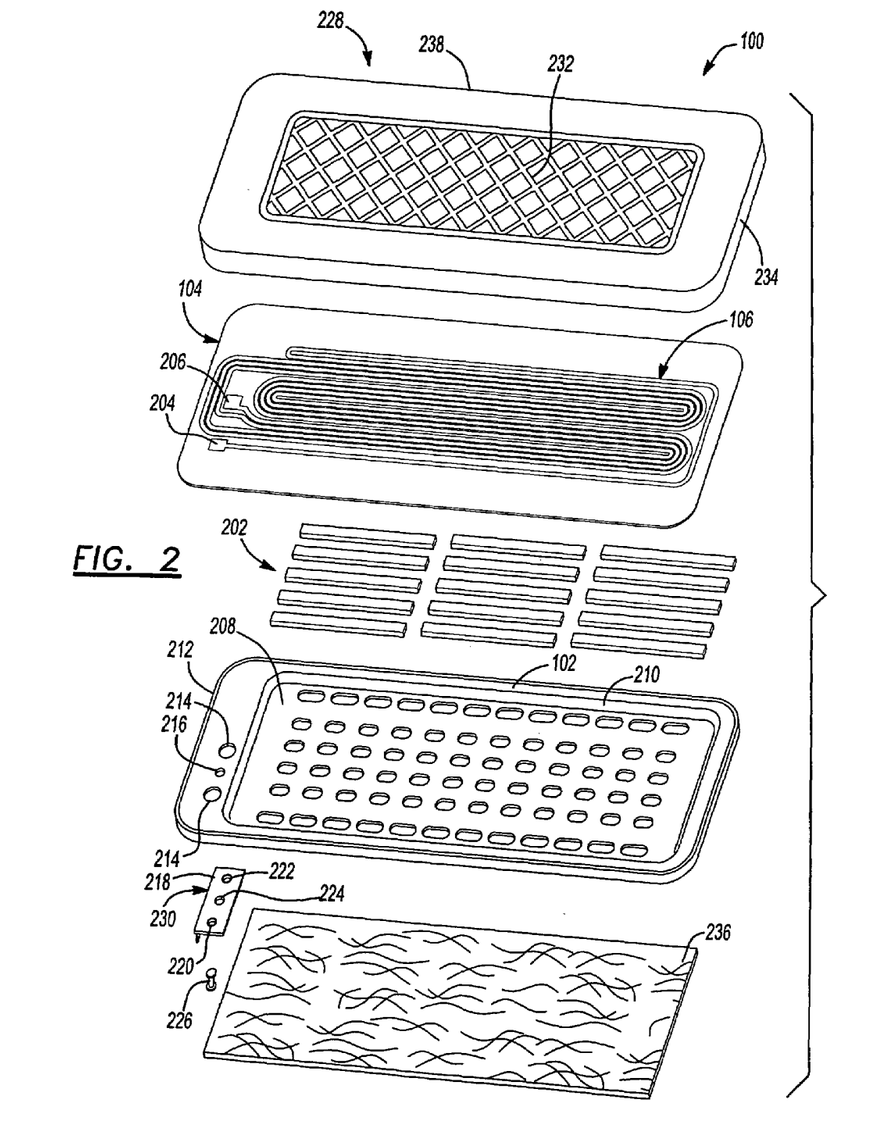
FIG. 2 is an exploded perspective view of the electro-dynamic loudspeaker shown in FIG. 1 having a grille.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a connector assembly 230.

Connector assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple connector assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

Figure 3:
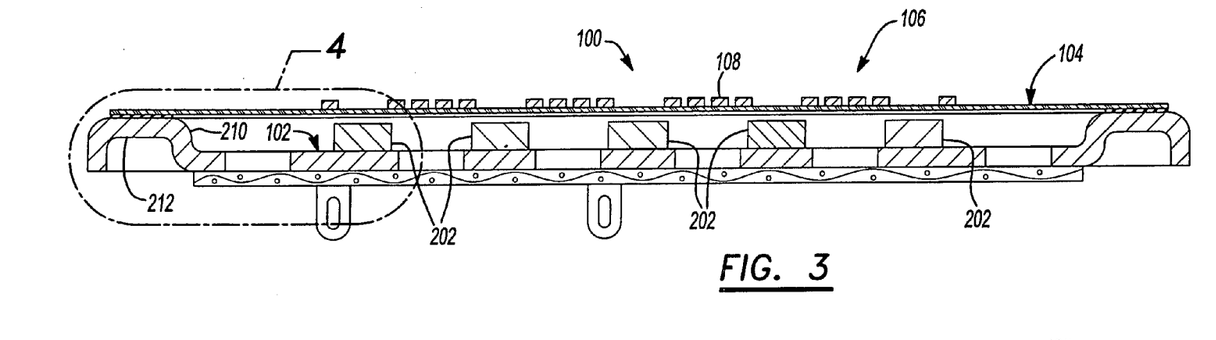
FIG. 3 is a cross-sectional view of the electro-dynamic loudspeaker taken along line 3—3 of FIG. 1.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

Figure 4:
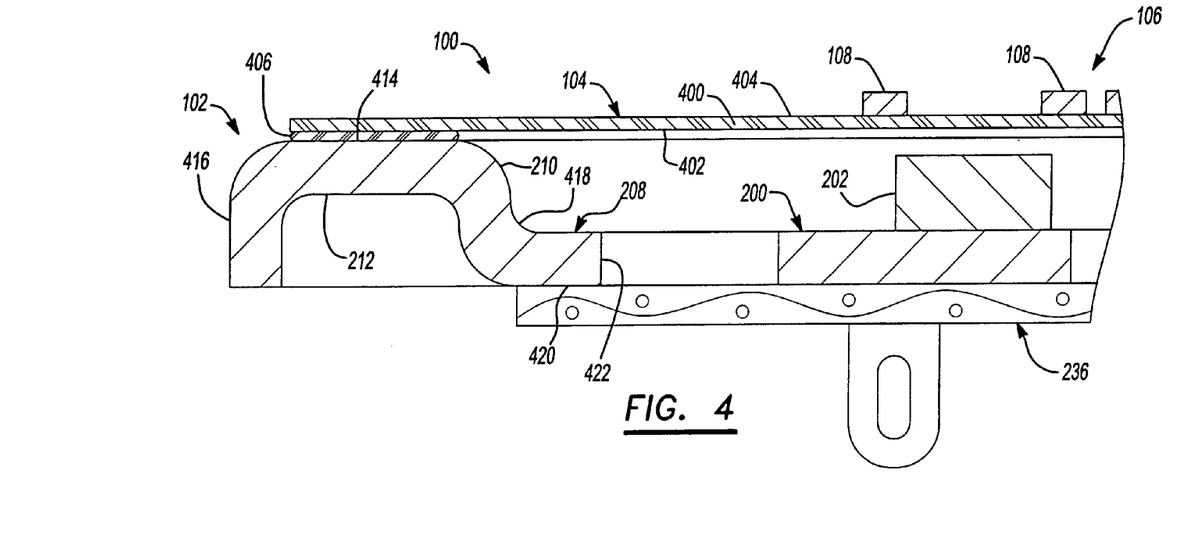
FIG. 4 is an enlarged cross-sectional view of the encircled area of FIG. 3.
Figure 5:
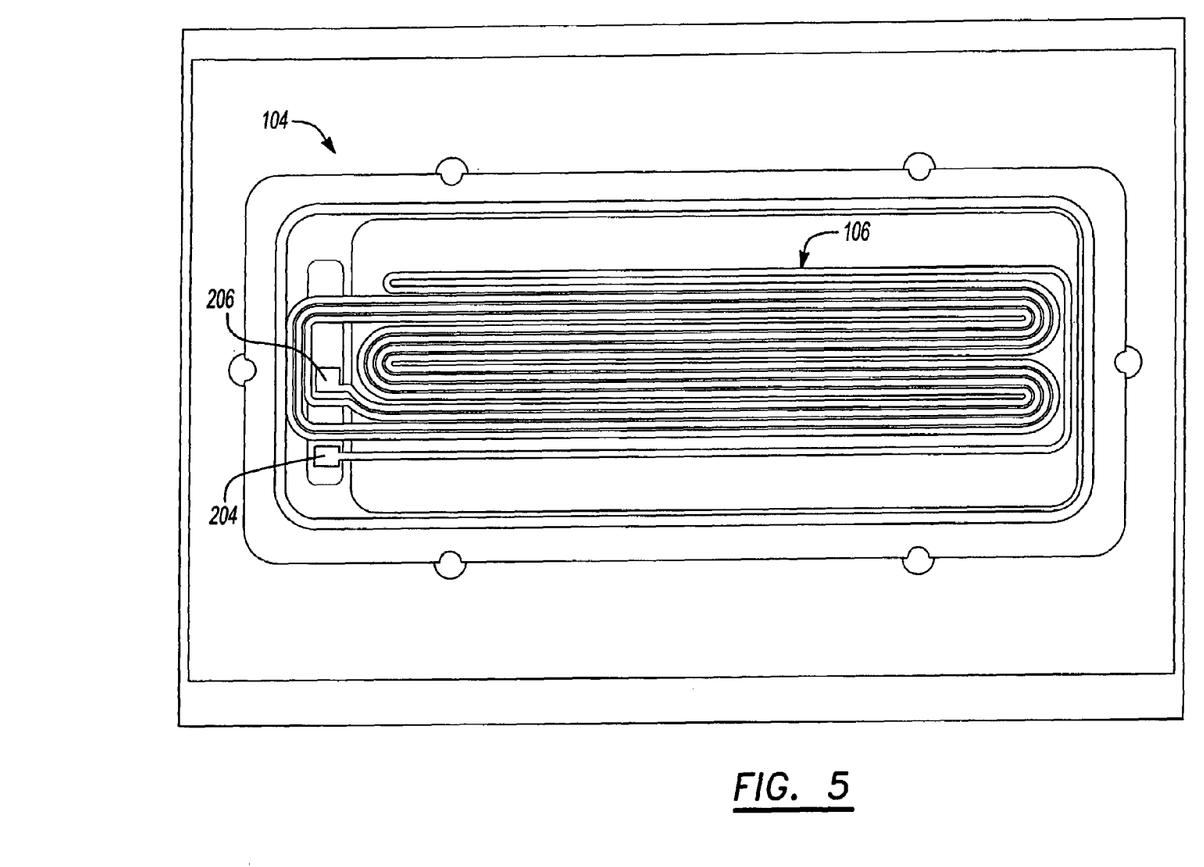
FIG. 5 is a plan view of the film having a conductor attached to the diaphragm.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame 102 in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

The conductor 106 on the film 400 must be terminated to a connector to allow audio current to be applied from a power amplifier. Preferably, the termination is achieved through a rapid assembly process and provides a mechanically and electrically robust connection. Also, the connection should be environmentally robust in order to withstand harsh temperatures and humidity.

Figure 6:
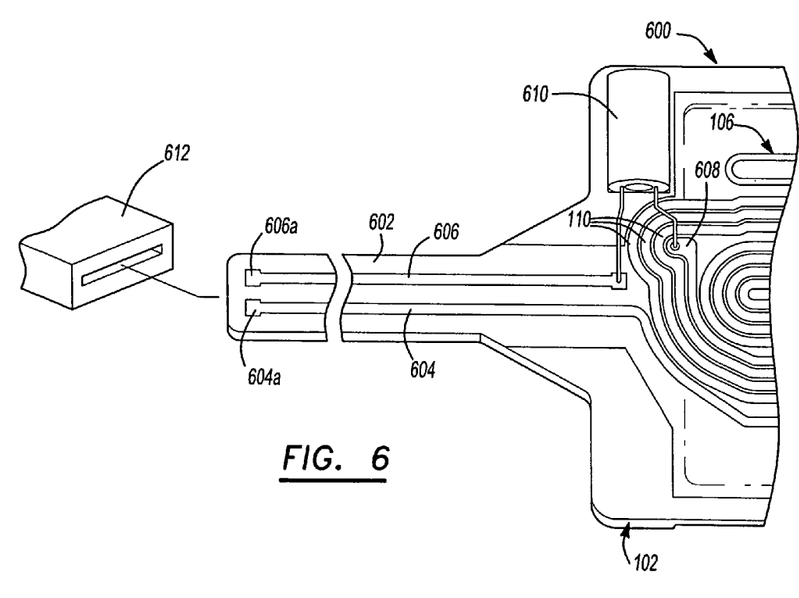
FIG. 6 is a detailed exploded perspective view of an electrical connector for an electro-dynamic loudspeaker.

As shown in FIG. 6, a first embodiment of an electrical connector is shown wherein the diaphragm 600 includes an extension portion 602 that extends beyond the periphery of the frame 102. The extension portion 602 is provided with two electrical trace portions 604, 606 each of which have a terminal end portion 604a, 606a. The extension portion 602 of the diaphragm serves as a wire harness. Due to the configuration of the traces of the conductor 106, a terminal end portion 608 of the conductor 106 has interfering radii 110 of traces 108 disposed between the terminal end 608 and the outer periphery of the conductor 106. In order to connect the terminal end 608 to the elongated trace 606, a capacitor 610 is mounted on the frame 102 and used as a jumper for connection between the terminal end 608 of the conductor 106 and the trace 606 provided on the extension portion 602 of the diaphragm 600. The capacitor 610 can be connected to the terminal end 608 and trace 606 by soldering or other known connecting methods. The capacitor 610 in addition to serving as a jumper over the interfering foil traces 108, allows the elimination of distortion by preventing low frequency signals from crossing over at or above a predetermined frequency.

Figure 7:
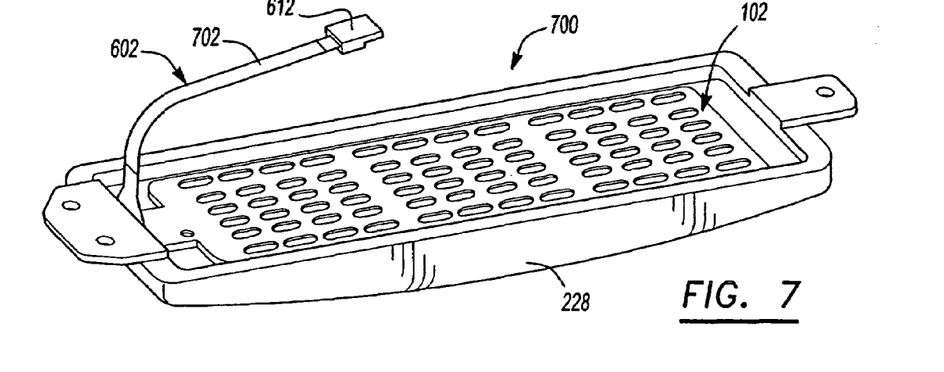
FIG. 7 is a perspective view of an electro-dynamic loudspeaker having an electrical connector as shown in FIG. 6.
Figure 8:
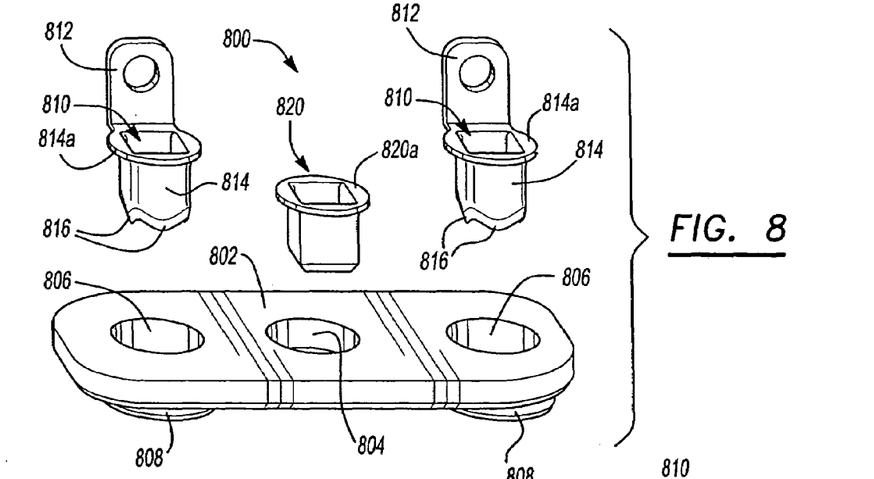
FIG. 8 is an exploded perspective view of an electrical connector.
Figure 9:
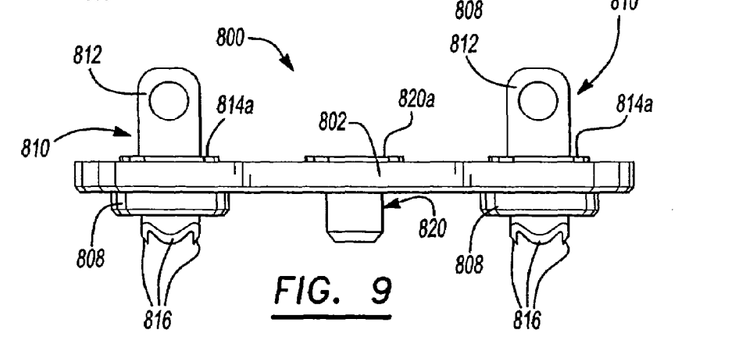
FIG. 9 is a plan view of the electrical connector of FIG. 8.

A hardblock connector 612 is connected to the end of the extension portion 602 in electrical contact with the terminal ends 604a, 606a of the electrical traces 604, 606. The hardblock connector 612 pierces the traces 604, 606 to make electrical contact therewith. The connector 612 is capable of providing a snap fit with a corresponding receptacle in order to provide an electrical connection to the conductor 106 of the electro-dynamic loudspeaker 700 as illustrated in FIG. 7. As illustrated in FIG. 7, the extension portion 602 of the diaphragm 600 can be provided with a backing 702 including a layer of tape or other material capable of strengthening the extension portion 602.

The connector of FIGS. 6 and 7 provide a mechanically and electrically robust connection system that has a simple construction and can be easily assembled.

With reference to FIGS. 8–11, an electrical connector assembly 800 according to a second embodiment of the invention will now be described. The electrical connector assembly 800 includes a terminal base member 802 including a centrally located mounting aperture 804 and a pair of terminal apertures 806. The terminal base member 802 includes a pair of bosses 808 extending around the pair of terminal apertures 806. A pair of terminal lugs 810 are each provided with an eyelet portion 812 and a body portion 814. The body portion 814 can be cylindrical in shape or have flattened side faces, and preferably includes a plurality of pointed tip portions 816.

Figure 10:
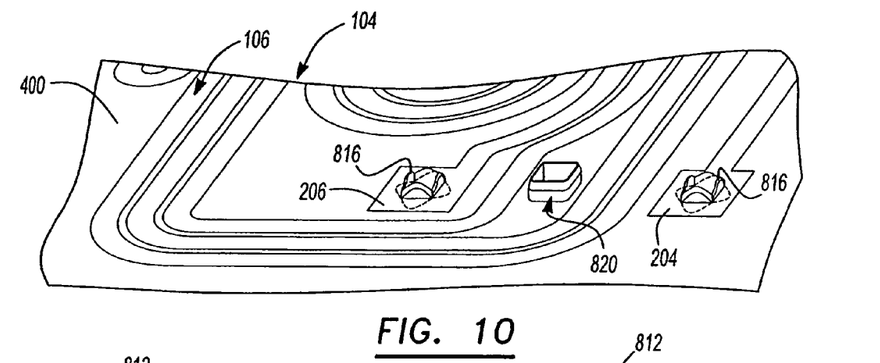
FIG. 10 is a perspective top view of the electrical connector of FIGS. 8 and 9 mounted on an electro-dynamic loudspeaker.
Figure 12:
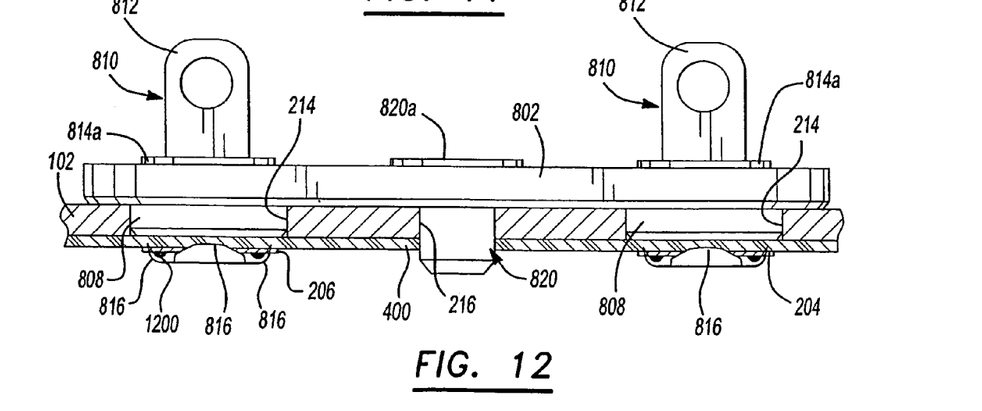
FIG. 12 is a partial cross-sectional view of another electrical connector.

During assembly, the terminal base member 802 is disposed on the back side of the frame 102 such that the bosses 808 are received within apertures 214, as best illustrated in FIG. 12. The terminal lugs 810 are then inserted through the terminal apertures 806 so that the pointed tips 816 of the terminal lugs 810 pierce through the film 400 and terminal end portions 204, 206 of the conductor 106. The pointed tip portions 816 are then crimped outwardly to overlay the terminal ends 204, 206, as best shown in FIG. 10.

Figure 11:
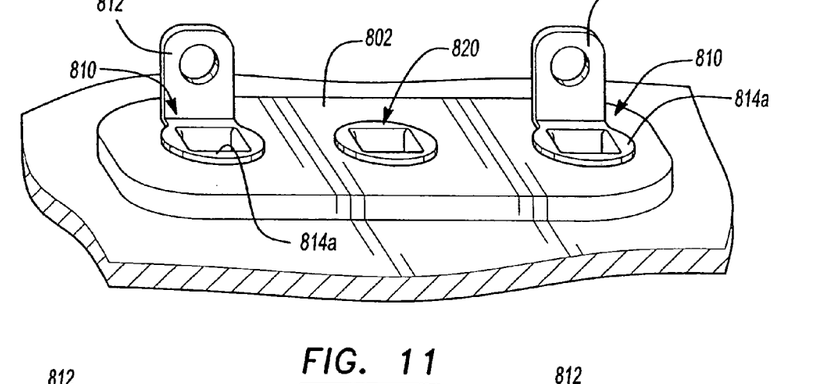
FIG. 11 is a perspective bottom view of the electrical connector of FIGS. 8 and 9 mounted on an electro-dynamic loudspeaker.

A fastener 820 is inserted through the mounting aperture 804 of the terminal base member 802 and through the mounting aperture 216 in the frame 102 so that it also pierces through the film 400. The fastener 820 is also then crimped outwardly in order to secure the terminal base member 802 to the frame 102. Each of the terminal lugs 810 includes a radially extending outer flange portion 814a extending from the body portion 814 for seating against the terminal base member 802, on the back side thereof. Similarly, the fastener 820 includes a radially extending flange portion 820a which also seats against the back surface of the terminal base member 802, as best shown in FIGS. 11 and 12. It should be noted that the terminal base member 802, terminal lugs 810, and fastener 820 can be preassembled with the terminal lugs 810 and fastener 820 being press fit, or otherwise secured, within the terminal base member prior to assembly on the frame 102.

Figure 18:
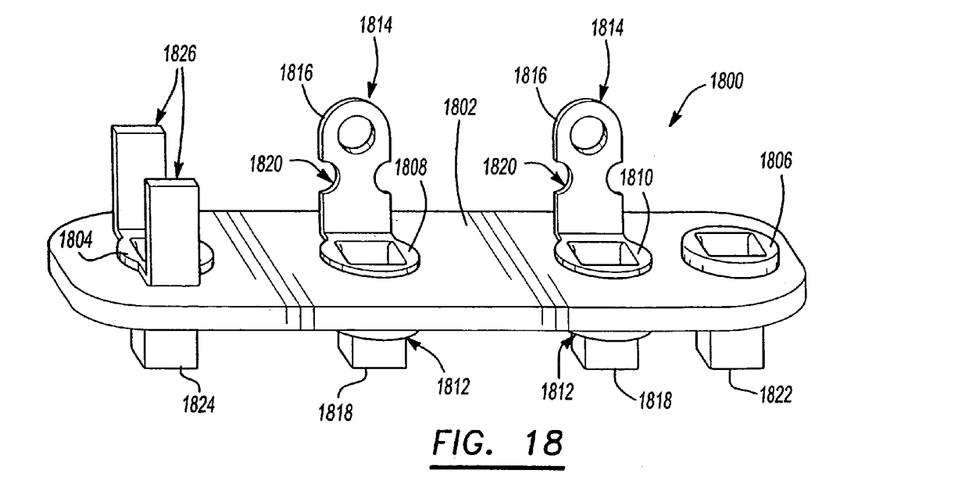
FIG. 18 is a perspective top view of an electrical connector.

FIG. 18 shows an alternative electrical connector assembly 1800 including a terminal base member 1802 including first and second mounting apertures 1804, 1806 and a pair of terminal apertures 1808, 1810. The terminal base member 1802 includes a pair of bosses 1812 extending around the pair of terminal aperture 1808, 1810.

A pair of terminal lugs 1814 are each provided with an eyelet portion 1816 and a body portion 1818. The terminal lugs 1814 are received in the terminal apertures 1808, 1810. The body portion 1818 can be cylindrical in shape or have flattened side faces. The eyelet portions 1816 are provided with a thermal break portion 1820 in the form of notches provided in the side edges thereof that reduce the cross-sectional area for reducing thermal conductivity and limiting heat transfer from the solder area to the electrical eyelets 1816. A pair of mechanical eyelets 1822, 1824 are received in the mounting apertures 1804, 1806 and are crimped over the steel frame for providing a mechanical connection of the electrical connector assembly 1800 to the frame. The second mechanical eyelet 1824 is provided with strain relief blades 1826 which are crimped around the wire harness for transferring mechanical forces from the harness to the frame rather than to the solder lug connections.

Optionally, electrical joint compound 1200 can be provided between the terminal ends 204, 206 of the conductor 106 and the crimped rivet or fastener tips 816, as shown in FIG. 12. The electrical joint compound 1200 is commercially available under the name ALNOX and includes a grease-like material including metallic or electrically conductive particles which when crimped between the terminal ends 204, 2026 and the electrical lugs 810 contact the surfaces thereof in order to provide electrical connection therethrough. The particles typically include nickel plated aluminum oxide grit in order to provide conductive particles with relatively sharp edges which are capable of piercing or deforming the surface of the terminal ends 204, 206 of the conductor 106 to provide an electrical connection therewith.

Figure 13:
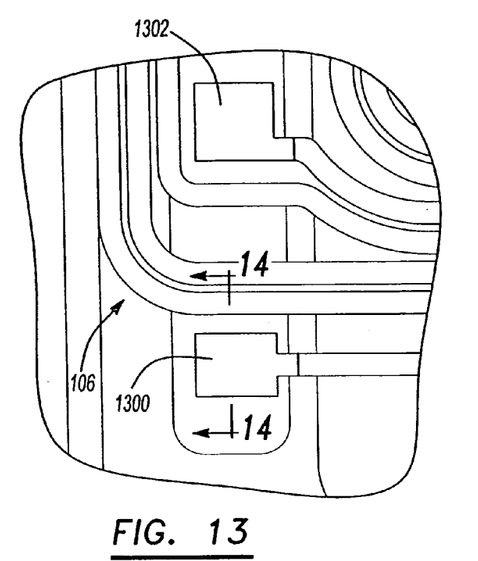
FIG. 13 is a detailed plan view of the trace terminal ends layered with copper.
Figure 14:
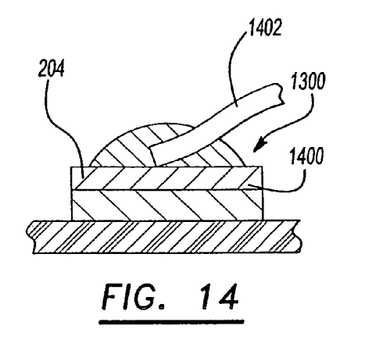
FIG. 14 is a cross sectional view taken along the line 14—14 of FIG. 13 with a lead wire soldered to the trace terminal ends.

One of the problems associated with working with an aluminum conductor 106 is that an oxide on the surface makes soldering very difficult. Thus, a flux is utilized to break through the oxide layer enabling the solder to wet out on the aluminum surface. However, the flux material is corrosive to the aluminum and must be washed off completely and thoroughly after being used. Washing off the flux material requires water and brushing and is time consuming and messy. This adds additional steps and therefore costs to the assembly process. As illustrated in FIG. 13, an alternative connector arrangement is provided in that the terminal ends 1300, 1302 of the conductor 106 are provided with a thin layer of copper 1400 so that a pair of lead wires 1402 (one of which is shown in FIG. 14) can be connected to the terminal ends 1300, 1302, using conventional soldering processes.

Alternatively, a thin copper plating can be placed over the entire aluminum foil trace 106 in order to also enable conventional soldering techniques. Also the conductor 106 can also be made from a thinner copper foil in order to reduce the difficulties involved with terminating to aluminum. Because the copper is significantly heavier than aluminum, the copper traces are thinner both in thickness and width as compared to the aluminum foil traces. The reduced thickness and width of the copper allows the diaphragm 104 to be maintained with a low moving mass so as to not inhibit the production of sound by the diaphragm 104.

Figure 15:
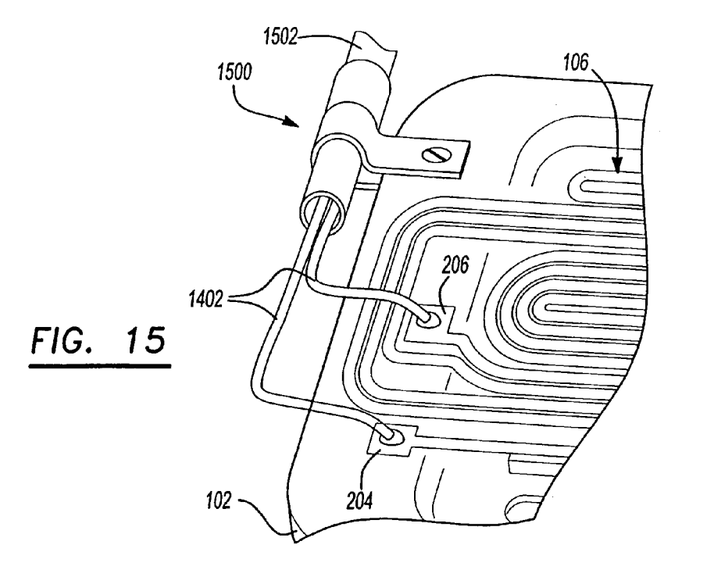
FIG. 15 is a perspective view of an electro-dynamic loudspeaker having an electrical connector.

When lead wires are soldered or welded directly to the terminal ends 204, 206 of the conductor, as illustrated in FIG. 15, a strain relief mount 1500 is preferably utilized in order to prevent the wire 1502 from being pulled and damaging the electrical connection between the lead wires 1402 and the terminal ends 204, 206 of the conductor 106. The strain relief fastener 1500 can be in the form of a clamp that is fastened to the frame 102 or can be in the form of any other mechanical connector that prevents forces imposed upon the wire 1502 from being imposed upon the lead wires 1402 which are connected to the electrical conductor 106.

Figure 16:
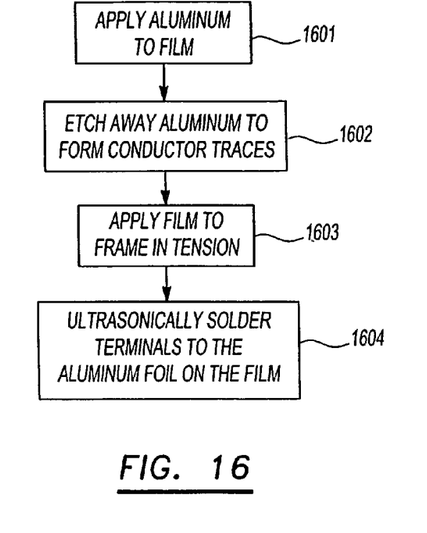
FIG. 16 is a process diagram providing the steps for forming an ultrasonic soldered electrical connector.

As shown in FIG. 16, an alternative process for forming an electrical connection is outlined. At step 1601, the layer of aluminum is applied to the film 400. At step 1602, the aluminum is selectively etched away in order to form the conductor traces. The film 400 is then applied to the frame 102 in tension (step 1603). At step 1604, the terminals that can be in the form of lead wires are ultrasonically soldered to the aluminum foil on the film. The ultrasonic soldering process does not require reactive fluxes as is required with conventional soldering processes that are used with aluminum and therefore does not require the extra brushing and cleaning steps required for conventional soldering processes. The ultrasonic soldering process causes cavitation of the aluminum that removes the oxidation on the surface and allows the solder to wet out. Ultrasonic solderers are commercially available for carrying out this type of ultrasonic soldering process. With this type of electrical connection, a strain relief device 1500, such as illustrated in FIG. 15, is also preferably desired in order to prevent forces from acting upon the lead wires and potentially damaging the connection.

Figure 17:
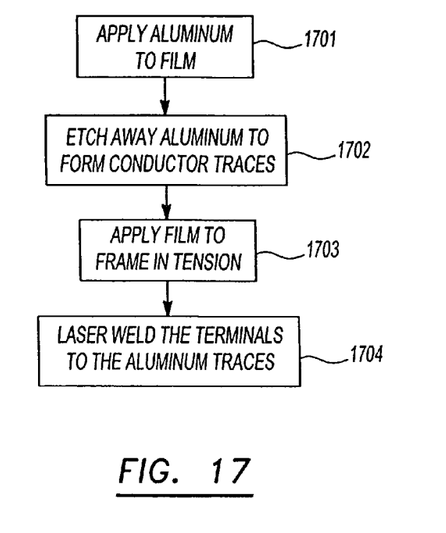
FIG. 17 is a process diagram providing the steps for forming a laser welded electrical connector.

FIG. 17 illustrates the method steps of an alternative laser weld electrical connection. At step 1701, a layer of aluminum is applied to the film 400. The aluminum is then selectively etched away to form the conductor 206 (step 1702). The film 400 is then applied to the frame 102 in tension at step 1703. At step 1704, the terminals in the form of lead wires are then laser welded to the terminal ends 204, 206 of the aluminum traces. The laser welding fuses the wire and aluminum terminal ends together. Again, as illustrated in FIG. 15, a strain relief device 1500 is preferably utilized to prevent forces applied to the wire from being applied to the lead wires for damaging the laser welded connection. The strain relief can be provided by a clamp, rivets, fasteners or an in molded snap feature provided on the frame 102.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An electro-dynamic loudspeaker, comprising:
    a frame;
    a diaphragm secured to the frame and including an extension portion extending beyond a periphery of the frame; and
    an electrical circuit disposed on a surface of the diaphragm and including a pair of electrical traces disposed on the extension portion of the diaphragm.

2. The electro-dynamic loudspeaker according to claim 1, further comprising a connector mounted on an end of the extension portion in electrical contact with the pair of electrical traces.

3. The electro-dynamic loudspeaker according to claim 1, further comprising means for connecting the pair of electrical traces on the extension portion of the diaphragm to a power amplifier.

4. The electro-dynamic loudspeaker according to claim 1, further comprising a plurality of magnets mounted to the frame.

5. The electro-dynamic loudspeaker according to claim 1, wherein the electrical circuit includes a plurality of elongate conductive paths.

6. The electro-dynamic loudspeaker according to claim 1, further comprising reinforcement means for reinforcing the extension portion.

7. The electro-dynamic loudspeaker according to claim 1, further comprising a layer of tape applied to the extension portion.

8. The electro-dynamic loudspeaker according to claim 1, where the electrical circuit includes a plurality of elongate conductive paths, one of the conductive paths being connected to one of the pair of electrical traces by a capacitor.

9. The electro-dynamic loudspeaker according to claim 8, where the capacitor is mounted to the frame.

10. The electro-dynamic loudspeaker according to claim 1, where the diaphragm is secured to the frame with an adhesive.

11. The electro-dynamic loudspeaker according to claim 1, where the electrical circuit is formed from aluminum.

12. The electro-dynamic loudspeaker according to claim 1, where the pair of electrical traces disposed on the extension portion of the diaphragm are formed from aluminum.

* * * * *